United States Patent [19]

Horsch

[11] Patent Number: 4,617,846
[45] Date of Patent: Oct. 21, 1986

[54] INTERCHANGEABLE TOOL HEAD FOR A NC MACHINE

[75] Inventor: Wilfried Horsch, Obrigheim, Fed. Rep. of Germany

[73] Assignee: GTE Valeron Corporation, Troy, Mich.

[21] Appl. No.: 703,068

[22] Filed: Feb. 19, 1985

[30] Foreign Application Priority Data

Feb. 23, 1984 [DE] Fed. Rep. of Germany ....... 3406490

[51] Int. Cl.[4] ............................................. B23B 41/04
[52] U.S. Cl. ........................................ 82/1.2; 82/1.4; 82/2 E; 409/233
[58] Field of Search .................... 82/1.2, 1.3, 1.4, 2 E; 409/233; 29/568

[56] References Cited

U.S. PATENT DOCUMENTS

| | | | |
|---|---|---|---|
| 3,311,003 | 3/1967 | Daugherty | 82/1.2 |
| 4,387,612 | 6/1983 | Eckle et al. | 82/1.2 |
| 4,409,721 | 10/1983 | Tomita et al. | 409/233 |

FOREIGN PATENT DOCUMENTS 309576  6/1976  U.S.S.R. ................. 82/1.2

*Primary Examiner*—Leonidas Vlachos
*Attorney, Agent, or Firm*—Robert E. Walter

[57] ABSTRACT

A tool for a nc machine is provided with a radially displaceable surface slide serving as a tool holder. The tool head is interchangeable by a tool head changing device mounted on the nc machine. The tool head is automatically releasably mounted on the work spindle by means of a clamping cone and a tie rod concentrically disposed within the work spindle and engaging the conical surface of the clamping cone. There is provided a pair of control rods for radially displacing the surface slide and for limiting the radial movement of the surface slide, which control rods are adapted to be automatically separated by releasable clutches for interchanging the tool head (FIG. 1).

7 Claims, 5 Drawing Figures

INTERCHANGEABLE TOOL HEAD FOR A NC MACHINE

DESCRIPTION

The present invention relates to a tool head for a rotating tool of a nc machine, comprising a surface slide serving as a tool holder, which surface slide is mounted in the tool head and is displaceable in a radial direction with respect to the spindle axis by means of an axially displaceable separable control rod concentrically disposed in the work spindle, and a clamping device for clamping the tool head to the work spindle of the nc machine.

Such types of tool heads comprising radially displaceable surface slides as used e.g. for turning, boring, threading, tapping, etc. have become known in the art (see e.g. German Pat. No. 17 77 296). The tool head may be connected to the work spindle by a screw connection. Quite often, the surface slide serving as a tool holder is arranged to have the tool automatically interchanged, i.e. the tool is mounted on the radially displaceable surface slide to be automatically interchanged by a tool change mechanism.

One object of the present invention is to provide a tool head of a nc machine having a radially displaceable surface slide, in which the tool head is interchangeable by a tool head changing device independently of any tool changing device which may be provided on the nc machine. Yet the surface slide's ability of radial displacement should be maintained.

A tool head including the above defined features, according to the present invention, is characterized in that the tool head is interchangeable with respect to the work spindle by a tool head changing device and in that the clamping device is automatically releasable and the control is automatically separable by a releasable clutch to interchange the tool head.

Additionally to the tool head interchanging device there may be provided a tool changing device for interchanging the tool with respect to the surface slide. So the present invention provides for a tool changing system having an increased flexibility.

Preferably the clamping device comprises a clamping cone and a tie rod disposed within the work spindle, which tie rod engages abutment surfaces at the conical surface of the clamping cone. Accordingly, the inside of the clamping cone is free to house the control rod for actuating the surface slide, the control rod having a clutch preferably in the form of ball locking means.

Within said control rod there may be disposed a second control rod for adjusting a stop member to limit radial movements of the surface slide, which second control rod may be also automatically separable by a releasable clutch.

A preferred embodiment of the present invention will be described in more detail with respect to the accompanying drawings in which FIG. 1 is a partially sectional side elevation of a tool head and the forward part of an associated work spindle;

Figure 1:
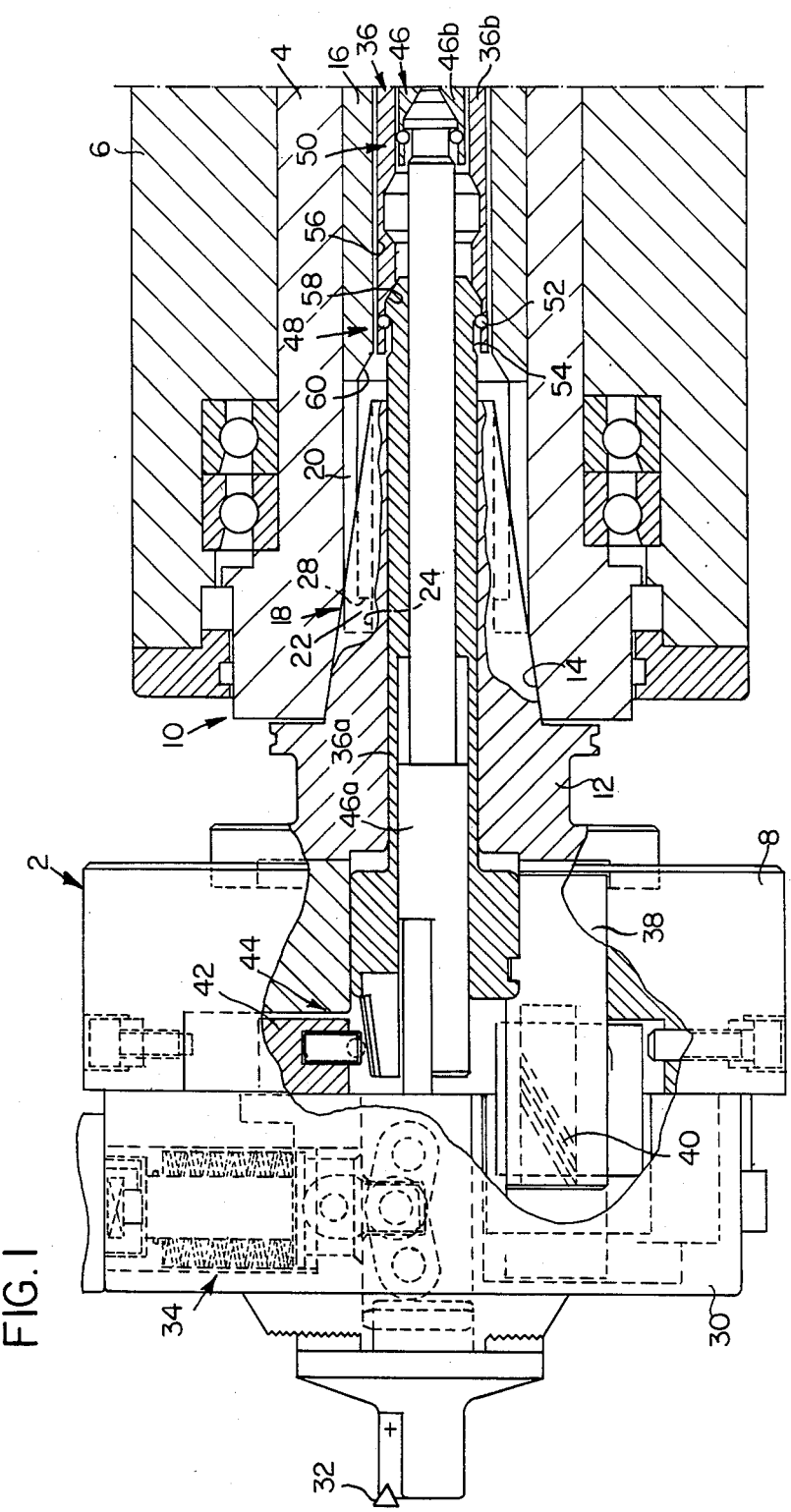

In FIG. 1, a tool head 2 on a work spindle 4 is rotatably mounted in a spindle casing 6 of a nc machine, the other parts of which are not shown in the drawings.

The tool head 2 comprises a main body 8 which is removably mounted to the work spindle 4 by a clamping device 10. For interchanging the tool head there is provided a tool head changing device (not shown) integrated in the nc machine.

The clamping device 10 comprises a clamping cone 12 threadably connected to the main body 8, which clamping cone has its conical surface received in a matingly shaped conical bore 14 of the sleeve-like shaped work spindle 4. The clamping cone 12 is adapted to be drawn into the conical bore 14 by means of a tie rod 16 which is axially displaceably mounted within the inner bore of the work spindle 4 and is adapted to be coupled to the clamping cone 12 by a releasably tie connection 18.

The tie rod 16 is biased in an axial direction e.g. by resilient means in the form of a plurality of Belleville springs (not shown) and will be displaced in the opposite direction e.g. by an hydraulically actuated motor (not shown). The rod connection 18 is formed like a bayonet locking means so that tie rod 16 must be able to perform a limited rotation which may be achieved e.g. by a toothed rack (not shown) to be displaced in a direction perpendicular to the spindle axis.

The tie connection 18 formed as a bayonet locking means comprises fingers 20 axially projecting from the forward end of tie rod 16, which fingers are provided with projections 22 extending radially inwards from their forward ends.

Figure 3:
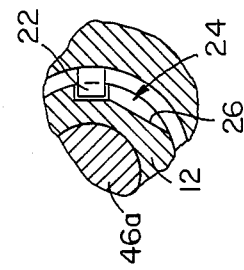
FIG. 3 is a detailed view on the line III—III in FIG. 2.
Figure 2:
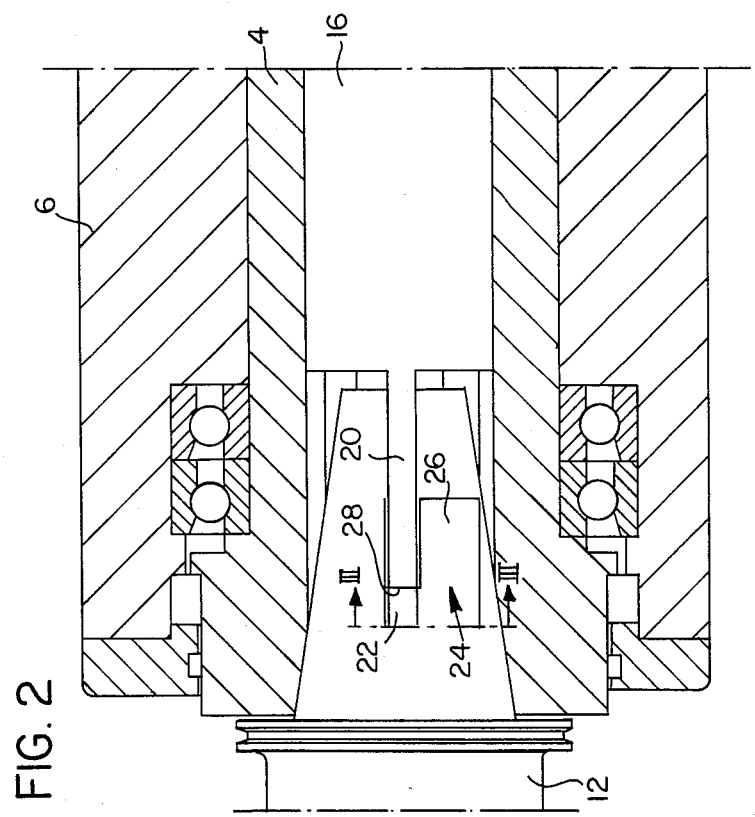
FIG. 2 is a view of certain details of the clamping device in FIG. 1 for connecting the tool head for the work spindle.

Projections 22 coact with recesses 24 formed at the conical surface of clamping cone 12 (see FIGS. 2 and 3). Each recess 24 comprises an axially extending bottom surface 26 which is continuous over a part of its width and is axially limited over the remaining part of its width in order to provide a radially extending abutment surface 28 (see FIGS. 1 and 2). This enables the projections 22 to be moved into the recesses 24 by an axial relative movement between tie rod 16 and clamping cone 12 and to be moved into abutment with abutment surfaces 28 by a following relative rotation between tie rod 16 and clamping cone 12.

Since tie connection 18 is provided on the outer surface of clamping cone 12, the inside of clamping cone 12 is free to receive control rods as will be explained hereinafter in more detail.

A surface slide 30 is radially displaceable within the main body 8 of tool head 2. Surface slide 30 serves as a tool holder for a rotating tool 32 clamped to the surface slide 30 by an automatically releasable clamping device 34 (as indicated by dotted lines) and interchangeable by a tool changing device (not shown).

An axially displaceable control rod 36 serves to radially displace surface slide 30, which control rod 36 is operatively connected to surface slide 30 via an axially displaceable toothed part 38 and inclined teeth 40 (indicated by dotted lines).

Radial displacement of surface slide 30 is limited by an adjustable stop member 42 which is radially displaceable within main body 8 and operatively connected to a second axially displaceable control rod 46 via cam means 44.

Control rods 36 and 46 are axially displaced e.g. by step motors (not shown) which may be numerically controlled in response to sensor signals.

Control rod 36 is separable and comprises a part 36a mounted in bores of main body 8 and clamping cone 12 and a part 36b mounted in a bore of tie rod 16. Parts 36a, 36b of control rod 36 are connected to each other by a clutch 48.

In the same manner control rod 46 is separable and comprises a part 46a mounted in a bore of part 36a of control rod 36 and a part 46b mounted in part 36b of control rod 36. The two parts 46a,46b of control rod 46 are connected to each other by a releasable clutch 50.

The two clutches 48 and 50 comprise ball locking means and are of substantially the same structure so that the description of one of the two clutches will be sufficient.

Figure 4:
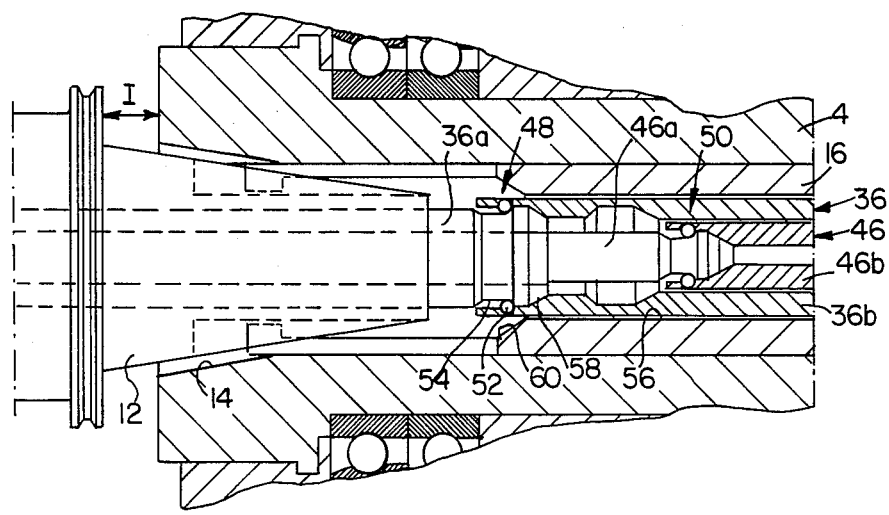
FIGS. 4, 5 are views of details of the connection between the tool head and the work spindle in different operative positions.
Figure 5:
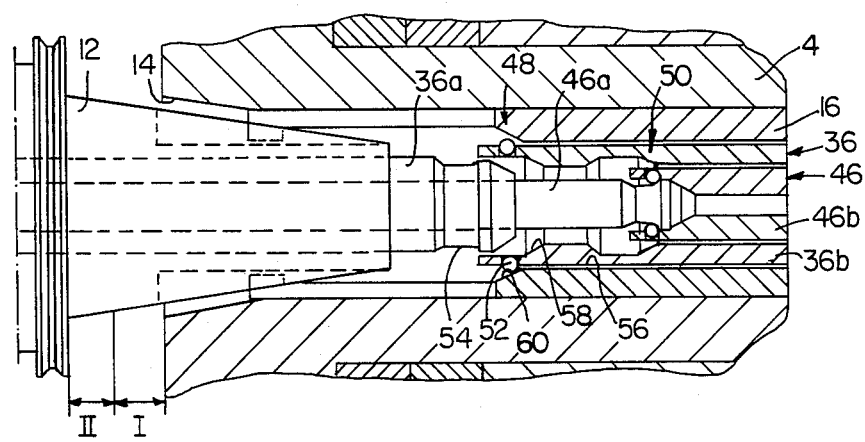

As shown in FIGS. 1,4 and 5 clutch 48 comprises balls 52 disposed in radial passages of the sleeve-like part 36b of control rod 36. When the clutch is in its engaged condition, balls 52 extend radially inwards and engage an annular groove 54 of part 36a of control rod 36 and provide a tie connection between the two parts 36a,36b of control rod 36 by engaging a rounded shoulder of annular groove 54.

When the clutch 48 is in a locked condition (FIG. 1), an escape of balls 52 radially outwards is prevented by the balls engaging a inner wall 56 of the bore of tie rod 16.

Part 36a,36b of control rod 36 engage each other by conical abutment surfaces 58 when the clutch is in its engaged position. So if part 36b is displaced to the left (in FIGS. 1,4 and 5), it drives part 36a due to connection 58. When this occurs balls 52 are moved into the range of a conical enlargement 60 of tie rod 16 so that balls 52 may be pushed radially outwards by the rounded shoulder of annular groove 54 when parts 36a,36b are axially moved relative to each other. Thereby parts 36a and 36b of control rod 36 are separated (FIG. 5).

As has already been mentioned, clutch 50 between parts 46a,46b of control 46 have the same structure as clutch 48, with part 36b of control rod 36 playing the role of tie rod 16.

The operation of the mechanism will now be described.

In the clamping condition as shown in FIG. 1 projections 22 of tie rod 16 engage abutment surfaces 28 of clamping cone 12 so that tie rod 16 draws clamping cone 12 into conical bore 14 of work spindle 4.

Work spindle 4 together with tool head 2 and surface slide 30 carrying the tool are driven in a conventional manner. Tie rod 16 and control rod 36,46 mounted within tie rod 16 and clamping cone 12 rotate together with the work spindle.

Since both parts 36a,36b of control rod 36 and both parts 46a,46b of control rod are positively connected to each other in both axial directions by clutches 48 and 50, respectively, surface slide 30 and stop member 42 may be radially adjusted when the tool is in operation. Tool 32 may be used e.g. for turning, but also for boring, threading, tapping and the like.

If tool head is to be interchanged it is first necessary to disengage tie connection 18. To this end tie rod 16 is rotated with respect to clamping cone 12 about an angle corresponding to the width of recess 24 so that projections 22 and abutment surfaces 28 are moved out of engagement.

The tool head changing device (not shown) now engages tool head 2 and removes it from work spindle 4 in an axial direction for a predetermined distance I (FIG. 4). During this lifting movement the two control rods 36,46 which are still unseparated are driven for the same distance by their associated drives (step motors) so that control rods 36 and 46 perform an axial relative movement with respect to tie rod 16 and work spindle 4. Due to this axial relative movement between control rod 36 and tie rod 16 balls 52 of clutch 48 are moved to their release positions (FIG. 4).

The tool head changing device now displaces tool head 2 for a predetermined second distance II (FIG. 5). During this movement part 36b of control rod 36 remains stationary so that clutch 48 is released and part 36a of control rod 36 is separated from part 36b.

During this movement the two parts 46a,46b of control rod 46 are axially displaced together with tool head 2 so that the balls of clutch 50 are moved in their releasing positions (FIG. 5). By a following further axial movement of tool head clutch 50 will be disengaged so that parts 46a and 46b of control rod 46 may be separated.

Tie connection 18 and the two clutches 58 and 50 now have been released so that tool head 2 may be separated from work spindle 4 and brought to a tool magazine (not shown). When a new tool head is to be mounted to the work spindle, the above described operative steps will have to be performed in a reverse order.

I claim:

1. A tool head for a rotating of a nc machine, comprising a surface slide serving as a tool holder, which surface slide is mounted in the tool head and is displaceable in a radial direction with respect to the spindle axis by means of an axially displaceable separable control rod concentrically disposed in the work spindle, and a clamping device for clamping the tool head to the work spindle of the nc machine, the improvement wherein said tool head includes a clamping device having a cone shaped end adapted to be inserted in a matingly shaped conical bore of the work spindle whereby said tool head is adapted to be interchangeable with respect to said work spindle, said work spindle having an axially displaceable tie rod disposed therein and concentrically surround the control rod, a releasable clutch operably associated with the separable control rod comprises ball locking means adapted to be released and locked by axial relative movements between said tie rod and said control rod and adapted to be moved into and out of engagement by axial relative movements whereby said clamping device is automatically releasable and the control is automatically separable by said releasable clutch to interchange the tool head, said control rod being operatively connected to said surface slide by inclined teeth, a stop member is adjustable in a radial direction by a second separable control rod which is disposed within said first control rod and automatically separable by a second releasable clutch.

2. A tool head according to claim 1, characterized in that said second clutch (50) comprises ball locking means adapted to be released and locked by axial relative movements between said first and second control rods (36,46) and adapted to be moved into engagement and out of engagement by axial relative movements between the two parts (46a,46b) of said second control rod (46).

3. A tool head according to claim 2, characterized in that the adjustable stop member (42) is mounted in the tool head (2) for radial movement and is operatively connected to said second control rod (46) by cam means (44).

4. A tool head according to claim 1, characterized in that said releasable tie connection (18) comprises radial projections (22) provided on said tie rod (16) which radial projections are adapted to be moved into engagement with radial abutment surfaces (28) of said clamping cone (12) by an axial relative movement and a following rotating relative movement between said tie rod (16) and said clamping cone (12).

5. A tool head according to claim 4, characterized in that the abutment surfaces (28) are formed in recesses (24) at the conical surface of the clamping cone (12) and said projections (22) of the tie rod (16) project radially inwards.

6. A tool head according to claim 5, characterized in that said projections (22) are provided on fingers (22) axially projecting from the forward end of the tie rod (16).

7. A tool head according to claim 6, characterized in that the tool (32) is adapted to be clamped to the surface slide (30) by an automatically releasable clamping device (34) and to be interchanged with respect to the tool head (2) by means of a tool changing device.

* * * * *